United States Patent [19]

Schoeneberger et al.

[11] Patent Number: 4,860,379

[45] Date of Patent: Aug. 22, 1989

[54] DATA COMMUNICATIONS SYSTEM

[75] Inventors: Carl F. Schoeneberger; Allan B. Bundens, both of Carrollton, Tex.

[73] Assignee: General Instrument Corporation, New York, N.Y.

[21] Appl. No.: 262,245

[22] Filed: Oct. 20, 1988

Related U.S. Application Data

[63] Continuation of Ser. No. 127,571, Dec. 2, 1987, abandoned, which is a continuation of Ser. No. 617,142, Jun. 4, 1984, abandoned, which is a continuation of Ser. No. 540,913, Oct. 12, 1983, abandoned, which is a continuation of Ser. No. 359,515, Mar. 18, 1982, abandoned, which is a continuation of Ser. No. 40,466, May 18, 1979, abandoned.

[51] Int. Cl.[4] .............................................. H04B 3/50
[52] U.S. Cl. ......................................... 455/5; 358/86; 340/825.54
[58] Field of Search ................... 358/84, 86; 455/2, 3, 455/4, 5, 6; 340/502, 504, 505, 533, 534, 825.52, 825.53, 825.54

[56] References Cited

U.S. PATENT DOCUMENTS

| | | | |
|---|---|---|---|
| 3,050,712 | 8/1962 | Bruck | 455/2 |
| 3,651,471 | 3/1972 | Haselwood | 364/900 |
| 3,702,460 | 11/1972 | Blose | 340/825.15 |
| 3,733,430 | 5/1973 | Thompson | 455/4 |
| 3,794,922 | 2/1974 | Osborn | 455/2 |
| 3,828,313 | 8/1974 | Schull | 340/151 |
| 3,832,690 | 8/1974 | McVoy | 375/110 |
| 3,936,747 | 2/1976 | McVoy | 375/45 |
| 4,021,649 | 3/1977 | Fort | 364/900 |
| 4,156,847 | 5/1979 | Tazawa | 455/5 |
| 4,161,720 | 7/1979 | Bogacki | 340/310 A |

FOREIGN PATENT DOCUMENTS

| | | | |
|---|---|---|---|
| 845329 | 2/1970 | Canada | 340/79.2 |
| 894452 | 2/1972 | Canada | 340/113 |
| 907209 | 8/1972 | Canada | 354/233 |
| 908846 | 8/1972 | Canada | 354/233 |
| 909390 | 11/1972 | Canada | 354/233 |
| 909955 | 11/1972 | Canada | 354/233 |
| 936966 | 11/1973 | Canada | 354/233 |
| 947833 | 5/1974 | Canada | 340/100 |
| 954231 | 9/1974 | Canada | 354/233 |
| 983626 | 2/1976 | Canada | 354/233 |
| 1015458 | 2/1977 | Canada | 354/233 |
| 1020282 | 2/1977 | Canada | 354/230 |

Primary Examiner—Tommy P. Chin
Attorney, Agent, or Firm—Hopgood, Calimafde, Kalil, Blaustein & Judlowe

[57] ABSTRACT

A data communications system utilizes computer control at central and remote locations to provide general data acquisition and control functions as part of a cable television network. The data system includes a central data processor communicating with a plurality of remote data processors, each of which in turn interrogates, monitors and controls a plurality of groups of remote terminal unit. Each terminal unit includes a variety of security monitoring devices as well as other data generating apparatus useful in process control and data retrieval functions. Each terminal unit communicates with its remote data processor concerning the status of the security devices and receives commands from the remote data processor to carry out data acquisition and control functions including controlling access to the cable television network by the terminals. The remote data processors communicate with the terminal units utilizing both time and frequency division multiplexing in a frequency shift key mode. Communication between the remote data processor and the home terminals is preferably on the coaxial cable utilized for transmitting commercial programming for the television network. The central data processor includes a minicomputer interfacing with input/output devices and external data links. Each remote data processor includes a microcomputer having input/output devices attached thereto and interfacing between the minicomputer and the remote terminal units.

25 Claims, 6 Drawing Sheets

DATA COMMUNICATIONS SYSTEM

This application is a continuation of application Ser. No. 127,571, filed 12/2/87 which is a continuation of application Ser. No. 617,142, filed 06/04/84 which is a continuation of application Ser. No. 540,913, filed 10/12/83 which is a continuation of application Ser. No. 359,515, filed 03/18/82 which is a continuation of application Ser. No. 040,466, filed 05/18/79 all now abandoned.

BACKGROUND OF THE INVENTION

This invention relates to digital-type data communication systems. More particularly, the present invention relates to a computer-based data acquisition and control communications system operating as part of a television signal distribution network over bi-directional coaxial cable.

A number of cable television systems have been developed for two-way communication over coaxial cable to transmit data signals and television signals between subscriber locations and a central station. Such systems have been utilized for the control and monitoring of security systems in homes or businesses. Bi-directional cable communication systems have also proven useful in providing pay television services by monitoring the usage of the television by the subscriber and transmitting billing signals to a data processor located at a central station. Examples of such systems are disclosed in U.S. Pat. No. 3,794,922 issued to Osborn et al and U.S. Pat. No. 3,803,491 issued to Osborn.

Cable communication systems have been used in the past primarily for security monitoring and control functions and for controlling monthly subscription pay television. Recent developments in communications components and computer systems are making many additional applications technically feasible which will enable a subscriber to have a wide range of data acquisition and control uses. These applications include per-view premium television which allows the user to select and watch premium programs such as first-run movies on a pay-per-program basis, and user access to extensive data bases such as libraries and newspapers for the selective retrieval of large amounts of data to be viewed on the television screen. In addition, many electronic games can be provided from a central data base for home entertainment.

Moreover, sophisticated monitoring systems are contemplated which will have the capability of receiving and monitoring data from the user. These systems include remote meter reading techniques interfacing with home and business utilities to develop composite and simple billing for the customer, and energy management systems to assist the customer and the power company in more efficiently utilizing power consumption and conserving energy. Other types of monitoring systems which are becoming feasible include opinion polling, advertising feedback, home shopping and other user-service vender interfaces. In addition, a number of business applications are contemplated such as point-to-point data transmission, remote control operations and traffic control communications.

With the increased usage of such cable communication systems and the increased development of varied applications for such systems, the need has developed for more sophisticated and efficient data acquisition and control techniques. Most cable communication systems use some type of time multiplexing procedure in transmitting data which allows a central station to cyclically sample data from each of a number of home terminals over a fairly short period of time. This concept, called "time sharing or time division multiplexing (TDM)", is widely used in the computer and communications industries.

SUMMARY OF THE INVENTION

The present invention provides further improvements in efficiency by using frequency division multiplexing (FDM) in combination with time sharing. In this approach, a number of remote terminals are keyed to respond to a given interrogation frequency from the central processor, with each terminal responding at a different frequency. The interrogating central processor receives the signals of each responding terminal and sequentially processes the data from each signal. This approach minimizes the amount of identification data required for interrogation and time delay required for response, resulting in more efficient data transmissions.

To further improve cable communication flexibility and efficiency, the present invention also utilizes space division multiplexing (SDM) in combination with frequency and time division multiplexing. In space division multiplexing, a plurality of computer-controlled remote data processing systems are utilized, each controlling and monitoring a large number of user terminals by two-way time and frequency multiplexed signals. In turn, the remote data systems are monitored and controlled by a common computer-controlled central data processing system. Using this approach a separate remote data processor handles the housekeeping chores with each network of terminals, providing interrogation and command functions as needed. Interrogation and monitoring signals are transmitted between the remote data system and the central data system only in an interrupt mode for abnormal conditions and discontinuities. Otherwise, the central data system is free to manage the communications systems and provide general data base storage and control functions to the remote data systems.

In one aspect of the present invention, a communications system is provided for remote data acquisition and control. The communication system includes a central data processing system, a plurality of remote data processing systems in communication with the central data processing system and a plurality of remote user terminals each in communication with one of the remote data processing systems. The central data processing system comprises a first computer for processing, storing and retrieving data, and communications unit having multiple channels for simultaneous communication (SDM) with each of the remote data processing systems. Each remote data processing system comprises a second computer for processing, storing and retrieving data as well as a second communications unit for sequentially communicating with each of a group of remote user terminals by multiplexing procedures. Each of the remote user terminals includes a plurality of units for generating response data to be processed to one of the remote data processing systems, as well as a third communications unit for receiving control data from the remote data processing and for transmitting the response data to the remote data processing system.

For a better understanding of the present invention, together with other and further objects and features thereof, reference is made to the following description taken in connection with the accompanying drawings.

DETAILED DESCRIPTION OF THE ILLUSTRATED EMBODIMENT

Figure 1:
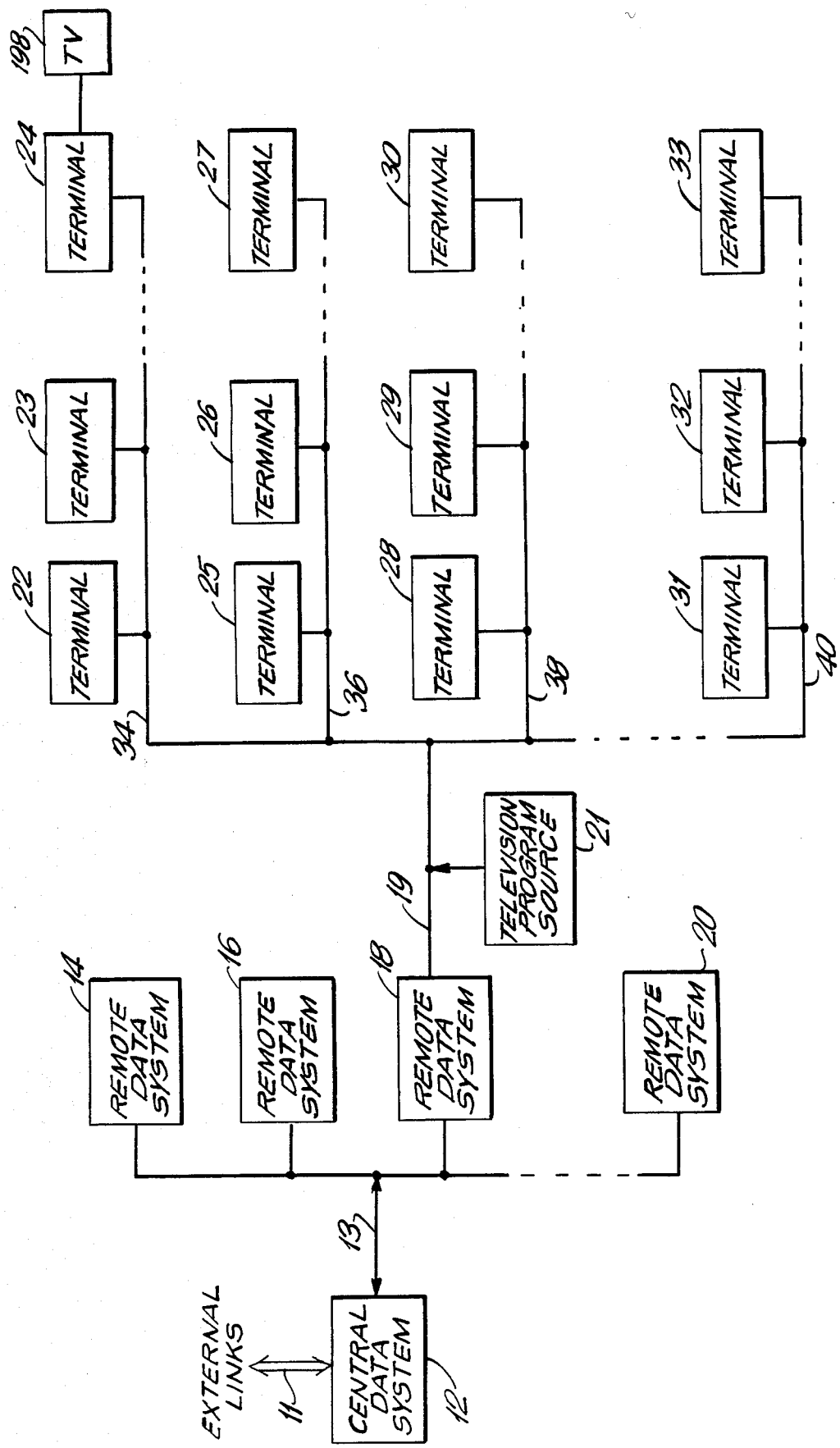
FIG. 1 is a block diagram of a preferred embodiment of the present invention.

Referring to FIG. 1, a preferred embodiment of the present invention is shown. Data communications system 10 is a highly sophisticated, computer based, general-purpose data acquisition and control system that communicates over bi-directional coaxial cable in conjunction with a cable television network. The system is designed to provide a wide variety of data acquisition functions including monitoring home or business security alarm devices. The system also provides sophisticated functions for monitoring and controlling subscriber-usage of the associated pay television network. In addition, system 10 has a uniform modular design enabling expansion of the system to provide additional functions such as energy management, meter reading, information retrieval, pay-per-view television, opinion polling, emergency alert and so forth.

As shown in FIG. 1, system 10 includes a central data processing system (CDS) 12, a plurality of remote data processing systems (RDS) 14-20 each connected by a data link 13 to CDS 12, and a plurality of groups of terminal units 22-33 connected by a plurality of data links to an RDS 18. It is understood that the other RDS units 14, 16, 20 have similar groups of terminal units in communication therewith.

CDS 12 is the central controlling unit for system 10. Its principal functions are to provide data storage and retrieval for the entire system and to monitor and control each RDS 14-20. Each RDS is preferably remotely located from CDS 12 and can communicate with the CDS by any of a number of different types of data links such as a dedicated phone line, fiber optic cables, microwave, radio frequencies or other communication means. It is important for each RDS to be located at or near the junction of the coaxial cable, called a cable plant, in order to obtain its radio frequency signals from the cable plant.

The CDS and RDS communicate in an "interrupt" mode wherein the RDS continually monitors and controls its terminals without assistance from the CDS. Interrupt data is transmitted to the CDS only if an abnormal condition is encountered by the RDS, thus freeing the CDS to provide overall management for the system. In communicating with RDS 18, CDS 12 can give instructions to perform specialized commands or interrogation polls of an individual terminal or groups of home terminals for meter reading or other similar functions. RDS 18 also has the capability to receive programming from CDS 12 if a specialized function is required. This two-way space division multiplexing is shown by "SDM" on line 13 in FIG. 1.

Each RDS 18 has a plurality of terminal units 22-33 in communication therewith by way of transmission line 19. Each terminal can be connected to a television receiver 198. The units are preferably arranged in a plurality of groups such as terminal units 22-24, referred to herein as group A, terminal units 25-27, referred to herein as group B, terminal units 28-30, referred to herein as group C and terminals 31-33 referred to herein as Group D. RDS 18 is designed to communicate with selected terminals in each of groups A, B, C and D on a cycled time-sharing basis, preferably every few seconds. This two-way time division multiplexing from one terminal set to the next is indicated by "TDM" and a two-way arrow below line 19 in FIG. 1. The terminals are polled using a standard downstream frequency and an identification number identifying a set of terminals comprising at least one terminal unit in each group. Those terminal units then respond each at a different frequency depending upon the group to which they are assigned. This one-way frequency division multiplexing for each terminal set is shown by "FDM" and an arrow in the return direction on line 19 in FIG. 1 and on line 87 in FIG. 3. RDS 18 reads the data of each of the terminals in turn to determine and record the response of each terminal. This time division multiplexing for each terminal set is indicated by "TDM" above the arrow in the return direction on line 78 in FIG. 4.

Figure 8:
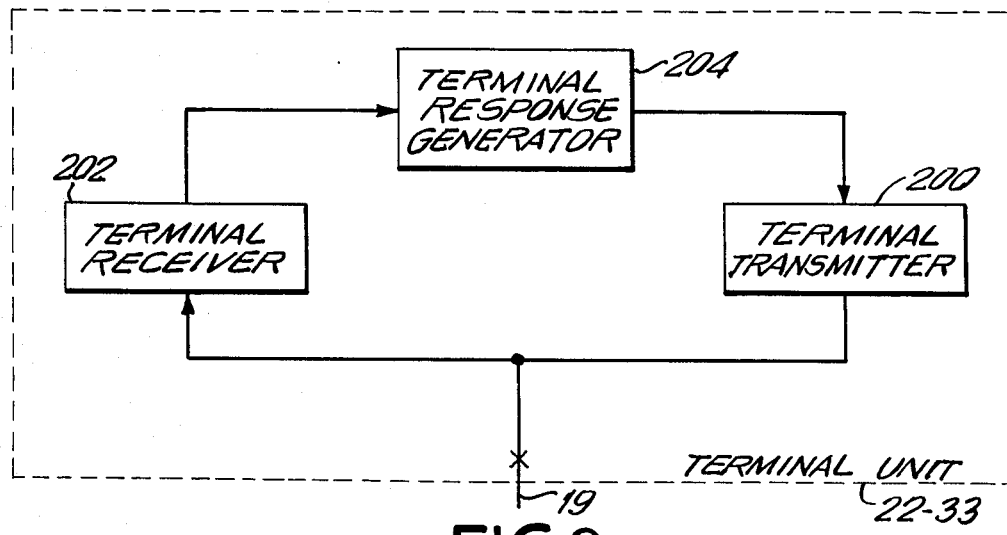
FIG. 8 is a block diagram of a terminal unit of FIG. 1.

As shown in FIG. 8, each terminal unit 22-33 has a terminal transmitter 200, a terminal receiver 202, and a terminal response generator 204. The terminal transmitter 200 and the terminal receiver 202 are connected to the transmission line 19. The response generator 204 receives its input from the output of the terminal receiver 204 and provides its output to the terminal transmitter 202.

In the security function, RDS 18 polls each terminal unit connected to it for its security status every few seconds in the polling cycle. As long as no alarm conditions are present, only monitor information is passed between the CDS 12 and RDS 18. When an alarm condition is detected by RDS 18, it reports the alarm to CDS 12 which then records the information and takes appropriate action. RDS 18 also monitors the operating condition of each terminal unit 22-33. If a terminal fails, or responds with continuous erroneous data, a monitor alarm is generated by RDS 18 and directed to CDS 12.

A television program source 21 inputs commercial pay television signals to line 19 for transmission to terminal units 22-33. The television signals are normally scrambled to prevent access to the programs by unauthorized subscribers. Each home television terminal includes appropriate descrambling apparatus which is activated or deactivated by control signals from the RDS to the remote data terminal unit. Program source 21 may be any conventional head end or remote hub unit designed for receiving, converting and transmitting TV signals.

In one preferred embodiment, CDS 12 is designed to communicate in parallel (SDM) with eight RDS units 18, each having a configuration to communicate with eight groups of terminals. Each group preferably contains 1,000 terminal units giving each RDS 18 the capability to communicate with 8,000 terminal units. The CDS in this embodiment thus has the capability to monitor up to 64,000 home terminals for alarm conditions and to provide numerous data acquisition and control functions for those terminals.

In a preferred embodiment, CDS 12 communicates with each RDS 14–20 by a RS 232 data line (SDM). Communication between each RDS 18 and its associated terminal units 22 is provided through a combination of time and frequency division multiplexing at RF frequencies. RDS 18 communicates downstream to the terminals on a cable plant, using a frequency shift key (FSK) mode of modulation at a standard frequency of 158.55 megahertz. The terminal units respond on separate frequency (FDM) to one of eight different receivers in the RDS for each of the eight groups using an FSK mode of modulation at standard frequencies between approximately 18.2 and 30 megahertz. The RDS then sequentially processes the data in the receivers (TDM).

As an example, RDS 18 transmits at 158.55 megahertz a downstream interrogation signal requesting the status of all terminal units having an identification number of 50. Assuming each of terminal units 24, 27, 30 and 33 have that identification number for their respective groups, each unit responds over its appropriate cable line at its group frequency (FDM) to one of the RDS receivers with its present status concerning the security device in question. Group A might transmit at 18.2 megahertz, group B at 18.6 megahertz, group C at 19 megahertz and group D at 19.4 megahertz. Since each group communicates at a different frequency, RDS 18 will be able to identify each responding terminal unit by determining the frequency of its response. Thus, by TDM processing the FDM transmitted data in the RDS receivers from first 18.2 megahertz, second 18.6 megahertz, third 19 megahertz and finally 19.4 megahertz, RDS 18 will be able to determine the status of terminal units 24, 27, 30 and 33 with a minimum of propagation delay time.

Figure 2:
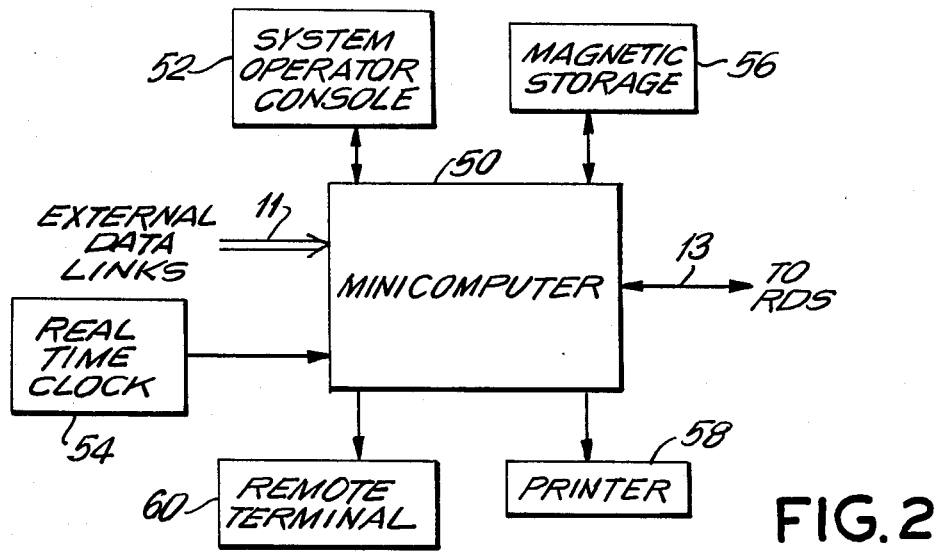
FIG. 2 is a block diagram of the central data processing system of FIG. 1.

Looking now at FIG. 2, CDS 12 comprises a computerized system having a minicomputer 50 at the center of its operations. Preferably, computer 50 is a general purpose computer having both a random access memory and a read-only memory. Computer 50 is controlled by a conventional system operator console 52, a real time clock 54 and external data links 11. Minicomputer 50 is connected to magnetic storage devices 56 such as magnetic disks and magnetic tape systems for building demographic data base and system files. Minicomputer 50 also outputs to printer devices 58 such as a hard-copy logger or a line printer. Output is also provided to a remote terminal 60 having similar hard-copy loggers and line printers as well as other optional items. Terminal 60 may be located at a remote station where emergencies can be readily reported such as at a fire station, police station or hospital.

CDS 12 communicates with the RDS units and is informed of alarm conditions entering and clearing each RDS. When an alarm condition is detected, minicomputer 50 processes this data and provides appropriate information for the system operator console 52, magnetic storage units 56 and printer devices 58. The operator acknowledges the alarm and takes the necessary emergency action through console 52. Demographic information which has been previously entered into the system and stored is displayed for each home terminal in an alarm condition. This data provides such information as the subscriber's name, address, medical history, and other emergency related data.

In one preferred embodiment of CDS 12, minicomputer 50 comprises a rack-mounted Hewlett Packard-1000 minicomputer system having standard operating systems software such that application programs may be developed for utilization with other data acquisition and control functions. These conventional software packages preferably can accommodate all terminal devices so that, for example, a meter reading package can be constructed allowing the gathering of data from the terminal units through the appropriate RDS for processing by minicomputer 50 and recording on the appropriate magnetic storage devices 56 and printer devices 58.

Figure 3:
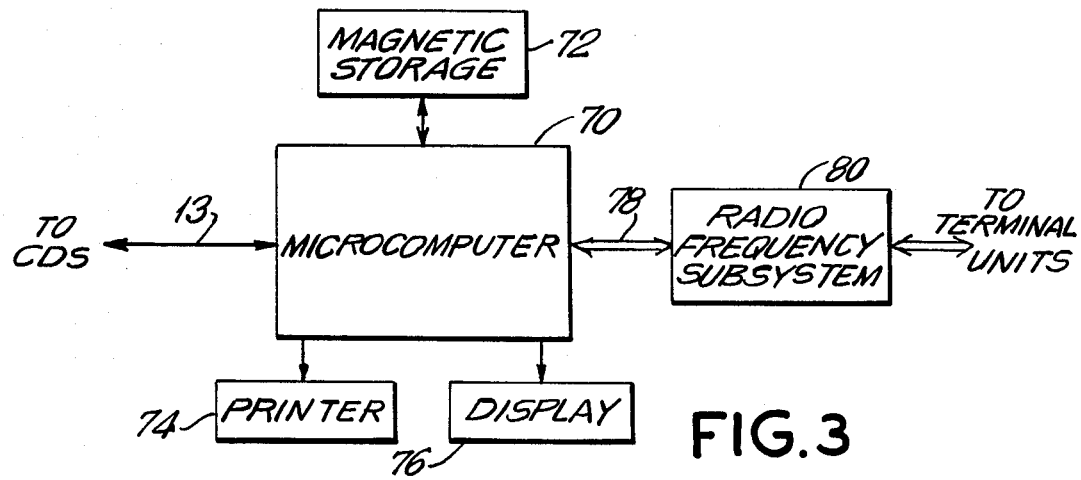
FIG. 3 is a block diagram of the remote data processing system of FIG. 1.

Looking now at FIG. 3, remote data processing system 18 is shown in greater detail. A microcomputer 70 is connected by data link 13 to minicomputer 50 of CDS 12. Magnetic storage devices 72 record and provide data concerning the terminal units associated with RDS 18. Printer unit 74 and display unit 76 provide the appropriate output channels for communicating onsite information concerning the status of the terminal units. A radio frequency subsystem 80 is connected between microcomputer 70 and data link 19 to the terminal units to communicate in the appropriate radio frequencies along the coaxial cables.

RDS 18 is designed to automatically poll its associated terminal units sequentially. When an alarm signal is received, the alarm data is processed by microcomputer 70 and data is provided to printer 74 to record the type of alarm, time of day and demographic data corresponding to the terminal in question.

In one preferred embodiment, microcomputer 70 comprises a Zilog MCZ-280 micro-computer system having a capacity of up to 64K bytes of semiconductor memory and two integral floppy disk drives. Standard software is provided including programmed read-only memory systems. Printer units 74 include a hard-copy alarm logger, and display unit 76 comprises a cathode ray tube unit. In the preferred embodiment, RF subsystem 80 comprises a frequency shift key transmitter/receiver circuit shown in FIG. 4 for providing frequency modulated data along cable 19 to the terminal units.

Although not shown, each terminal unit comprises a home terminal system having a plurality of sensors and alarm devices connected in parallel thereto. Preferably the remote terminal unit is one of the HT-3 systems made by Tocom, Inc. of Dallas, Tex. The alarm devices and sensor equipment are normally conventional items for the detection of fire, medical emergency, intrusion, assault, supervisor fault, tamper and battery low condition, all readily available in the marketplace.

The computer-based capabilities of the CDS 12 and RDS units 14–20 of the present invention provide the flexibility to accommodate in the same terminal group a variety of terminal units having different intelligence levels. A fairly simple type of terminal unit operates passively to routinely respond to cyclical interrogations by the RDS. A more sophisticated and intelligent terminal, described in our co-pending patent application, Ser. No. 040,472, filed May 18, 1979, takes upon itself most of the monitoring functions and only interrupts the RDS when an abnormal condition occurs.

Figure 4:
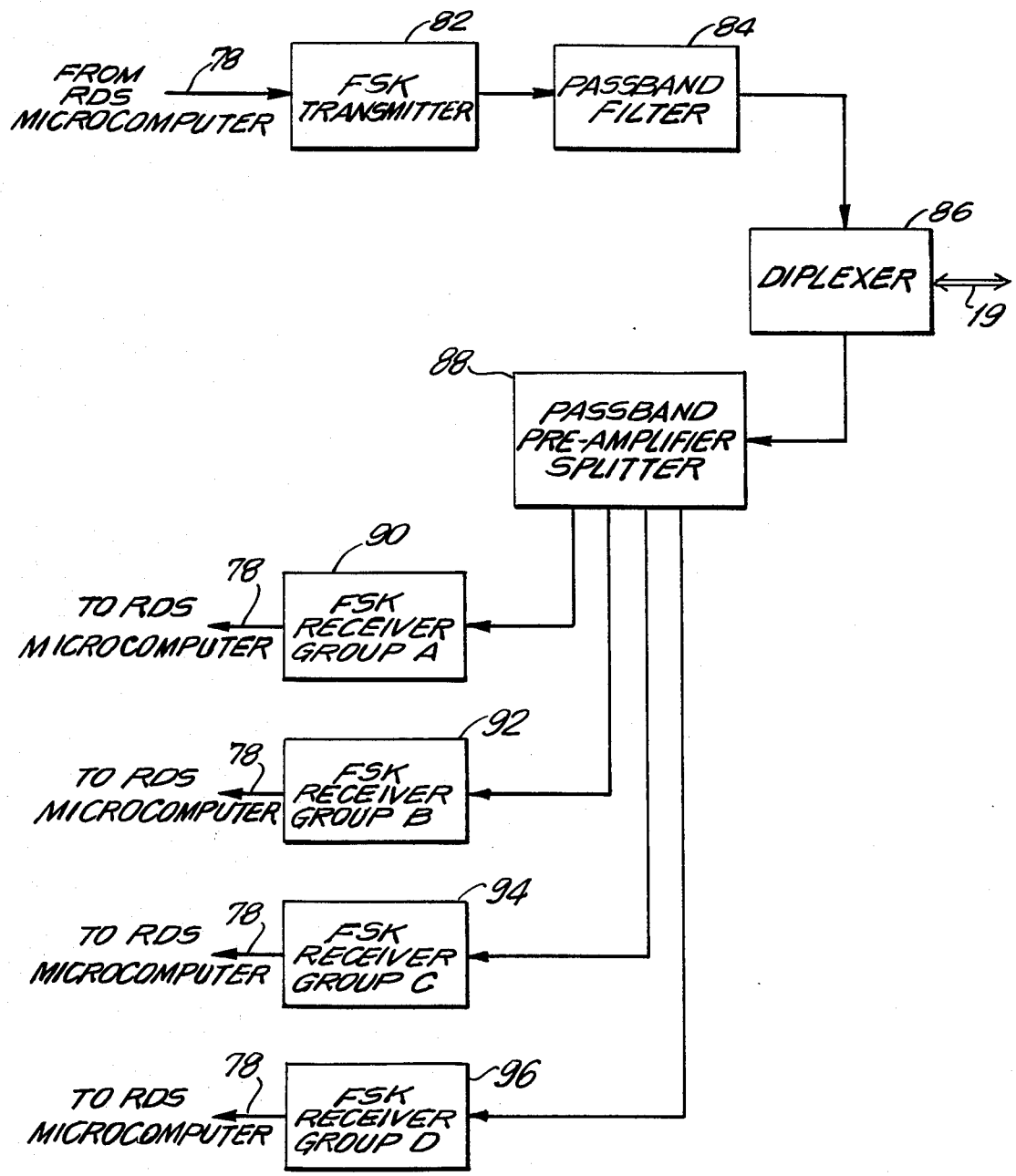
FIG. 4 is a block diagram of the RF subsystem shown in FIG. 3.

Looking now at FIG. 4, RF subsystem 80 of RDS 18 is shown in greater detail. Subsystem 80 is comprised of two main parts: a transmitter portion and a receiver portion. In the transmitter section, data is received from the RDS microcomputer 70 along data bus 78 to an FSK transmitter 82 which codes the data in a frequency shift key mode, preferably at the base frequency of 158.55 megahertz. Transmitter 82 then feeds the signal to a passband filter 84 to remove any undesirable harmonics. The signal is then fed to a diplexer 86 which outputs the signal for transmission on a coaxial cable 19 to the terminal unit.

The receiver section of RF subsystem 80 comprises a passband preamplifier splitter 88 connected to receive signals through diplexer 86 from the terminal units on cable 19 at the response frequencies previously mentioned. Splitter 88 separates the frequencies of the terminal response data and directs each frequency to a frequency shift key receiver for the group of terminals operating at that frequency. To use the previously mentioned example, the signal responses at 18.2 megahertz are passed to an FSK receiver 90 for the group A terminals. Terminal responses at 18.6 megahertz are transmitted to FSK receiver 92 for the group B terminals, responses transmitted at 19 megahertz are passed to FSK receiver 94 for group C terminals and responses at 19.4 megahertz from the group D terminals are passed to FSK receiver 96. Each one of receivers 90-96 convert the terminal response data from the frequency shift key mode to a digital mode for transmission along data bus 78 to microcomputer 70 of RDS 18.

Although not shown, it is understood that transmitter 82, preamplifier splitter 88 and receivers 90-96 are powered by a conventional DC power supply which in turn is powered by a 120 volt AC source.

It should now be appreciated that the system of the present invention is highly versatile for utilization with cable television distribution systems. The central data system and its corresponding remote data systems may be combined with one or more different types of cable TV networks in entirely different locations and having different transmission means and network configurations. The main limitation is that the remote data system must be located near the cable plant to communicate at RF frequencies with the terminal units. The central data system may be placed remotely at any desired location and may utilize any one of a number of different types of data links with the remote data systems as previously mentioned.

Figure 5:
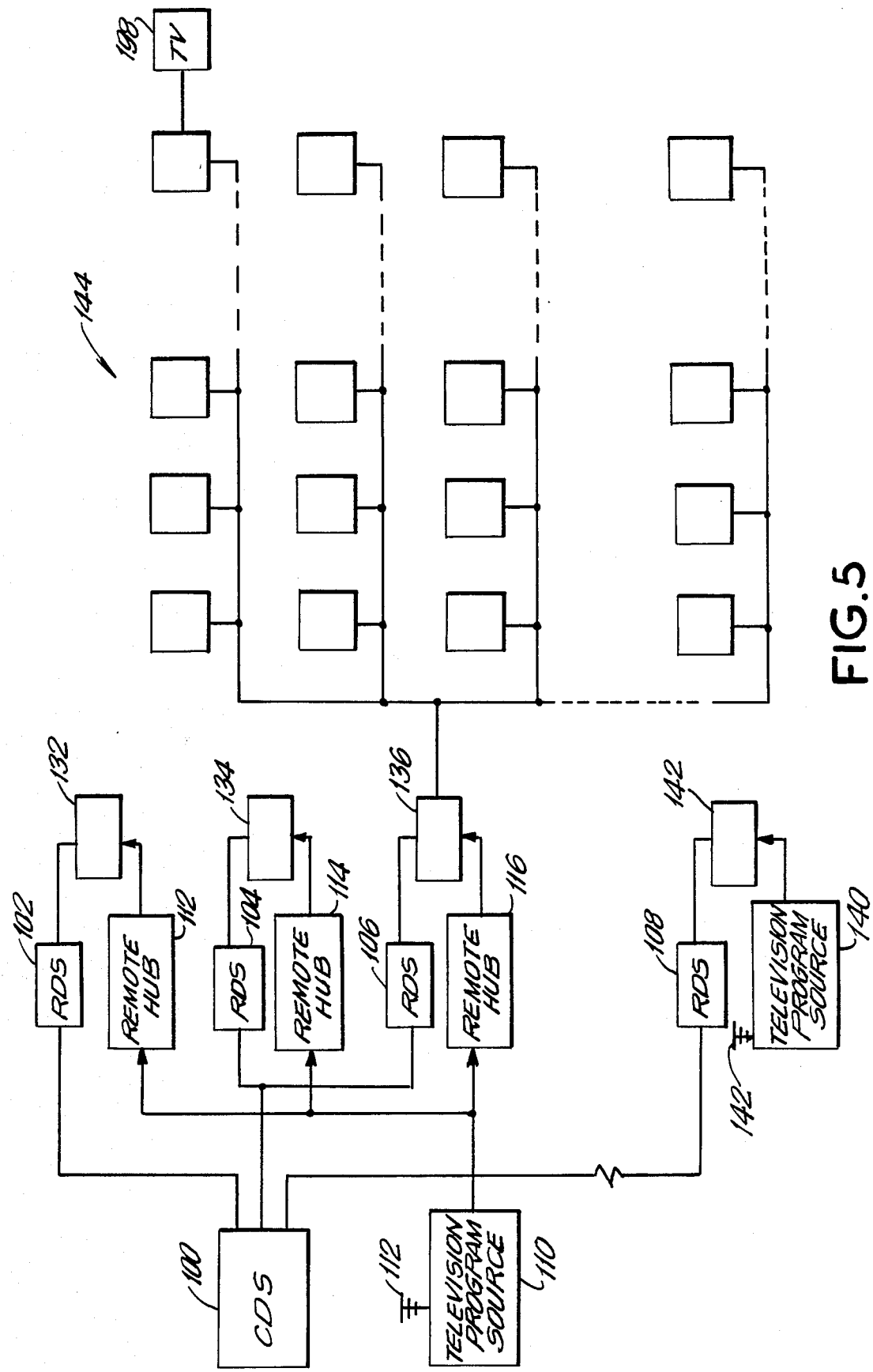
FIG. 5 is a block diagram of another preferred embodiment of the present invention.

With reference to FIG. 5, one possible configuration is shown of the relationship between the data acquisition and control system of the present invention and one or more television program sources. As shown therein, a CDS unit 100 communicates with RDS units 102, 104, 106 and 108. A television program source 110, sometimes called a main head end, receives television signals on antenna 111 and transmits the signals to three remote hub stations 112, 114 and 116 for further processing of the television channel data. Communication between CDS 100 and RDS 102 is by way of a separate line 120 which may be a dedicated telephone line or other separate communication link. Communication with RDS 104 and 106 takes place along a common transmission line 121, since it is assumed that both are in relatively close proximity to each other. Data is transmitted to RDS 108 over a separate line 124 which again may be a dedicated telephone line, a microwave transmission or some other dedicated communication means.

In the example shown, television program source 110 feeds remote hubs 112, 114 and 116 along a common transmission line 130, preferably coaxial cable. Output signals from hubs 112, 114 and 116 are directed to conventional signal splitters 132, 134 and 136, respectively. Likewise, the outputs of RDS units 102, 104 and 106 are fed to splitter units 132, 134 and 136 to provide the necessary control functions for the remote terminal units 144 to access the television signals from the associated remote hub units. Thus, a fairly large television program network involving a main head end and several remote hubs may be controlled by a central CDS and remotely located RDS units which link up with the CDS unit in whatever way may be convenient.

A separate TV program source 140 may be located in a remote television area and may receive substantially different programming over antenna 147. Nevertheless, the TV programming may be incorporated in the same data acquisition and control network by utilizing RDS 108 communicating with CDS 100 over a dedicated line 124. As with the other remote locations, the outputs of TV program source 140 and RDS 108 are fed to a signal splitter 142 which in turn directs the program signal and the RDS control data to the associated remote terminals. Thus, the data acquisition and control system of the present invention has the capability of controlling widely separated cable television networks which may have no interconnection or relationship with each other.

Figure 6:
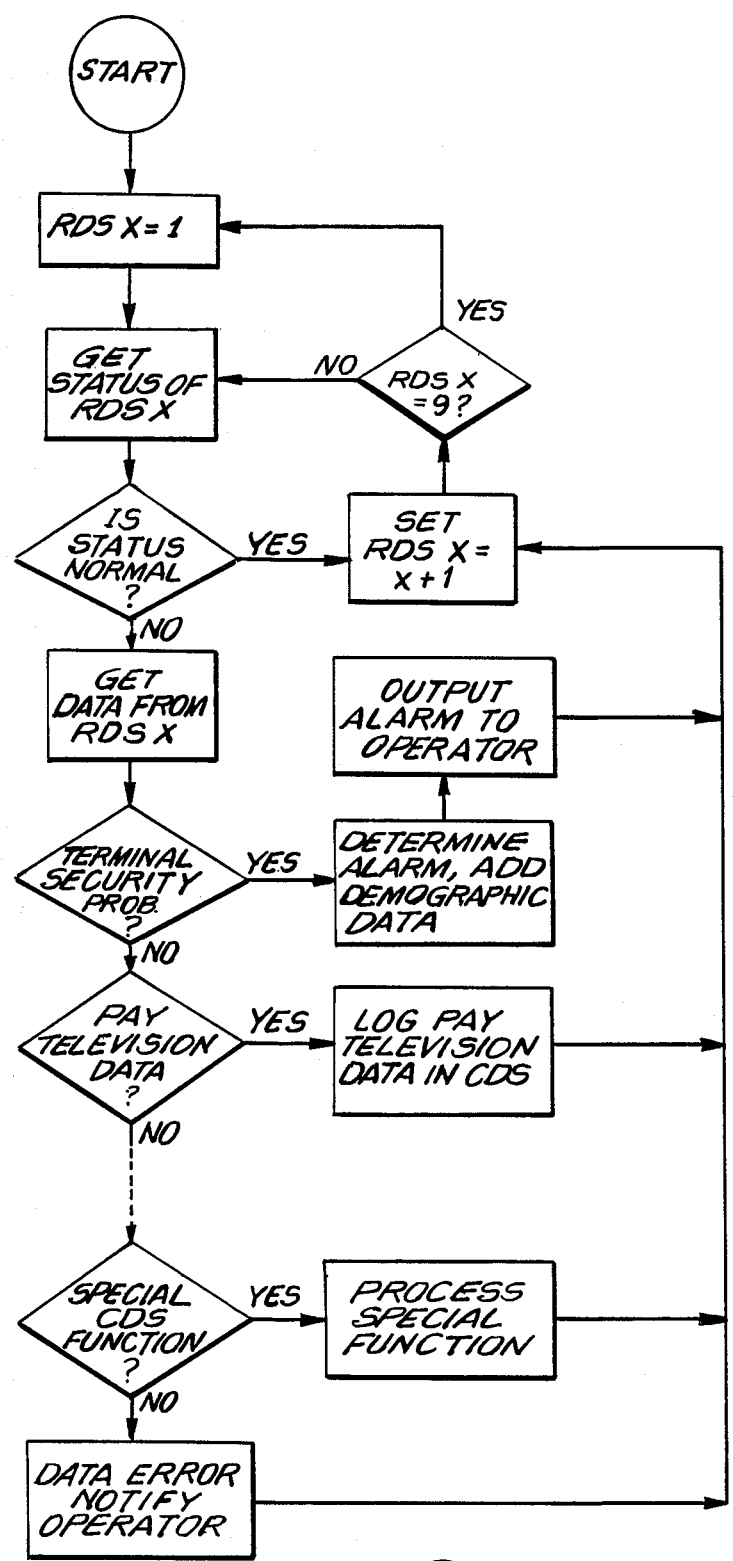
FIG. 6 is a flow diagram of the communication procedure between the central data processing system and the remote data processing system of FIG. 1.

Referring now to FIG. 6, a flow diagram is shown describing the basic monitoring procedures of the central data system by which it controls and monitors its associated remote data systems. These procedures are carried out by the operation of the program software in minicomputer 50 of central data system 12.

The monitoring procedure is begun by setting an RDS parameter X equal to one and then requesting the status of RDS X. If the status is normal and no attention is required by the CDS, it increments RDS X by one and determines whether the new X parameter is equal to nine. If not, the status of the RDS designated by the new RDS parameter is requested. If X is equal to nine, it is reset to one so that the sequential monitoring of the RDS units can begin again.

If the RDS status being monitored is determined to be abnormal, the CDS requests additional data from the RDS in question. The RDS then feeds the data concerning the abnormal condition to the CDS and a determination is made as to whether the data is related to a terminal security problem. If so, the CDS determines the alarm type and accesses demographic data from its own magnetic storage files to describe the alarm type and location. The appropriate alarm signals are then output to the operator. If the data is not related to a terminal security problem, inquiry is made as to whether the data may be related to a pay television procedure. If so, the CDS logs the pay channel being watched as well as the group and identification numbers and the day and time of subscriber usage. If not, a test is made to determine whether the data is related to any other acquisition or control function programmed into the CDS. Since the system is generalized, the types of functions which may be programmed into the CDS are innumerable. This flexibility is represented by the next step in the flow diagram indicating a test to determine whether the data from the RDS is related to whatever special function may be programmed in the system. If so, that function is processed and if not the signal is checked for data error and the operator is warned of some data which cannot be related to the CDS programming. After each data process has been completed, the CDS returns to the beginning of the program and the RDS parameter X is incremented by one to start the procedure again.

Figure 7:
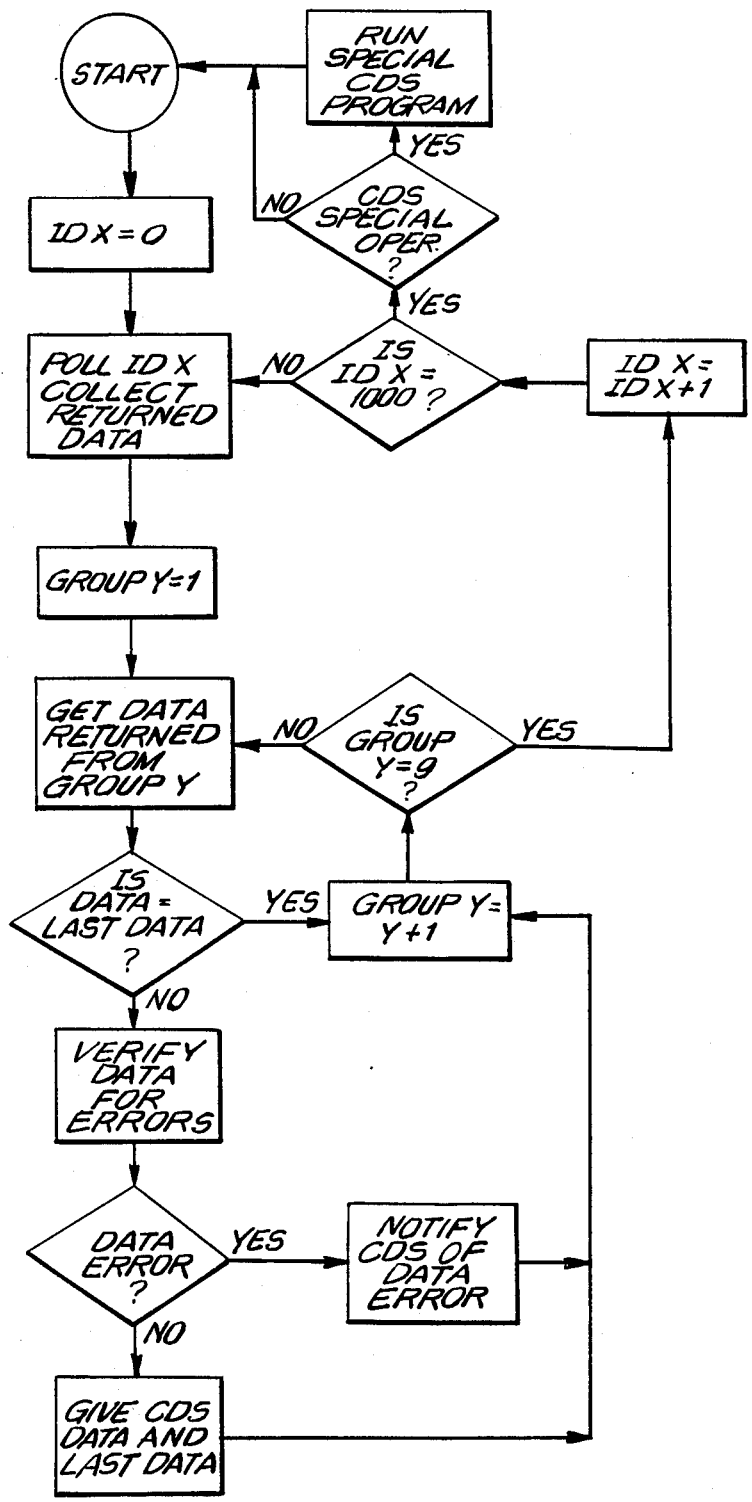
FIG. 7 is a flow diagram of the communication procedure between the remote data processing system and the terminal units of FIG. 1.

Looking now at FIG. 7, a similar flow diagram is shown to describe the procedure by which each RDS monitors its remote terminal units. It is understood that this procedure is embodied in the software of microcomputer 70 of each of RDS units 14–20. Referring to the preferred embodiment previously mentioned, there are 1,000 remote terminal units having identification numbers zero through 999 in each of eight groups having group numbers one through eight. Thus, there are 8,000 terminal units associated with each of the remote data systems. To start, an identification parameter X is assigned a zero value and each terminal unit having an ID of zero is polled. The RDS then collects data from each responding terminal in its appropriate receiver sections as previously described. A group parameter Y is set at one and data corresponding to the terminal response having that group parameter is read from the appropriate receiver into microcomputer 70. A test is made to determine whether the data is the same as the last time this unit was polled. If so, the group parameter Y is incremented by one and a determination is made as to whether Y is equal to nine. If so, all eight groups have been monitored so that the identification code can be incremented by one and the routine begun again.

If the data is not the same as the last time the unit was polled, a check is made by the RDS to determine whether there may be errors in the data. If a determination is made that the data is definitely different, the new and old data from the terminal in question is communicated to the CDS for appropriate action. If the data is determined not to be different, a data error has been encountered and the CDS is notified of that problem. In either case, the routine is then directed back to the stage where the group parameter Y is incremented by one and a test is made to determine whether Y is equal to nine. If so, the identification code is incremented by one and the next set of terminals having that identification code are polled.

Prior to polling the next group of terminals, a determination is made as to whether the identification parameter has reached 1,000. If so, a check is made to determine whether the CDS requires any special operations to be performed. If special operations are required, the appropriate CDS program is obtained and run by the RDS to provide the desired commands and functions for the remote terminals. The procedure is then returned to the starting point with the identification code set at zero so that all of the terminals may be again monitored.

While there have been described what are at present considered to be preferred embodiments of the present invention, it will be obvious to those skilled in the art that various changes and modifications may be made therein without departing from the invention, and it is therefore intended to cover all such changes and modifications as fall within the spirit and scope of the invention.

What is claimed is:

1. A communications system for remote data acquisition and control comprising;
    a central data processing system, a plurality of remote data processing systems in communication with said central data processing system and a plurality of remote user terminals each in communication with one of said remote data processing sytems, wherein:
    the central data processing system comprises first computer means for processing, storing and retrieving data, and first communication means having multiple channels for two-way data communication with each of said remote data processing systems;
    said each remote processing system comprises second computer means for generating and processing data to monitor and control the operation of each of a group of said plurality of remote user terminals, said second computer means being programmed for generating control data to control the operation of each of said remote user terminals and processing response data from each of said remote user terminals to monitor the operation of said each of said remote user terminals, and second communication means for two-way data communication with said remote data processing system and with each of said group of said remote user terminals, including means for transmitting said control data to said each in said group of said remote user terminals and means for receiving said response data from said each in said group of said remote user terminals; and
    each of said plurality of remote user terminals comprises means for receiving said control data from one of said remote data processing systems, means for generating response data in response to said control data and means for transmitting said response data to said one remote data processing system.

2. The system of claim 1 wherein said remote data processing systems control and monitor all routine operations of said remote user terminals, and the second computer means is further programmed for communicating with the central data processing system in response to special commands from the central data processing system.

3. The system of claim 2 wherein said second communication means each includes a frequency shift key means for communicating data between said remote data processing means and each of said remote user terminals in a frequency shift key mode.

4. The system of claim 2 wherein said response data is representative of a security status of said remote user terminal.

5. The system of claim 1 wherein said second computer means is further programmed for generating time division multiplexed (TDM) control data and processing TDM response data.

6. The system of claim 1 wherein said control data includes an identification number as a part of said control data, wherein said transmitting means simultaneously transmits said control data to a set of said remote user terminals responsive to said terminal identification number, and wherein said second computer means is further programmed for sequentially changing said terminal identification number to enable said transmitting means to transmit said control data to different sets of remote user terminals during sequential time intervals.

7. The system of claim 6 wherein said transmitting means transmits control data to said set of remote user terminals at a first frequency, and wherein said transmitting means of each of the remote user terminals in said set transmit response data to one of said receiving means of said remote data processing systems at a different frequency from said first frequency and from the frequencies of the response data of the other remote user terminals in said set.

8. The system of claim 1 wherein said receiving means of said second communication means comprises frequency means for receiving and processing frequency division multiplexed (FDM) response data.

9. The system of claim 8 wherein said frequency means comprises FDM receiver means for receiving FDM response data from a set of said remote user terminals, and differentiator means for separating the FDM response data by frequency for transmission to said second computer means.

10. The system of claim 9 wherein said remote user terminals are connected to said FDM receiver means in a plurality of groups, said set of terminals comprising a terminal in each group which is responsive to a common identification number, and wherein said FDM receiver means includes means for simultaneously receiving FDM data from said set of user terminals which have said common identification number.

11. The system of claim 1 wherein said response data is representative of an operating status of said remote user terminal.

12. The system of claim 1 wherein said first communications means comprises a radio frequency data link.

13. The system of claim 1 and further comprising television source means in communication with one of said remote data systems for transmitting television signals to the remote user terminals in communication with said remote data system, and wherein said second computer means of said remote data system is further programmed for generating control data to selectively enable and disable said user terminals to receive said television signals.

14. The communication system of claim 1 wherein said remote data processing systems control and monitor all routine operations of said remote user terminals, and the second computer means is further programmed for communicating with the central data processing system in response to nonroutine response data from the remote user terminals.

15. A communications system for remote data acquisition and control comprising:
a central data processing system, a plurality of remote data processing systems in communication with said central data processing system and a plurality of remote user terminals each in communication with one of said remote data processing systems, wherein:
the central data processing system comprises first computer means for processing, storing and retrieving data, and first communication means having multiple channels for two-way data communication with each of said remote data processing system, said first computer means being programmed for generating command data to control each said remote data processing system and processing interrupt data from each said remote data processing system, and said first communication means including means for transmitting said command data to each of said remote data processing systems and means for receiving said interrupt data from each remote data processing system;
each remote data processing system including second computer means for processing, storing and retrieving data, and second communication means for two-way data communication between said remote data processing system and each of a group of said remote user terminals, said second computer means being further programmed for generating control data to control the operation of each of a group of said remote user terminals, processing response data from each said remote user terminal to monitor the status of each said remote user terminal, and generating said interrupt data in response to response data from one of said remote user terminals indicative of a predetermined status of said one remote user terminal, said second communication means including means for receiving said data from said central data processing system, means for transmitting said interrupt data to said central data processing system, means for transmitting said control data to each of said group of remote user terminals and means for receiving said response data from each said remote user terminal;
each of said remote user terminals having means for receiving said control data from one of said remote data processing systems, means for generating said response data in response to said control data and means for transmitting said response data to one of said remote data processing systems.

16. A computer-operated data communications system for use in conjunction with a cable television distribution network having one or more television program sources and a plurality of remote cable television receivers communicating with said one or more sources over coaxial cable transmission lines, comprising:
a plurality of remote data terminal means for controlling and monitoring said plurality of remote cable television receivers, each of said terminal means being connected to one of said television receivers to control access of said one television receiver to said cable television distribution network;
a plurality of computerized remote data processing means for controlling and monitoring said remote data terminal means, each of said plurality of remote data processing means being in communication with a group of said remote data terminal means over the coaxial cable transmission lines used by said one or more television program sources to communicate with said remote television receivers;
each of said plurality of remote data processing means having primary communication means for transmitting and receiving multiplexed data to and from said plurality of remote data terminal means, for controlling access of said television receivers to the cable television distribution network and for receiving data representative of the operation of said television receivers including nonroutine data representative of abnormal operation of said television receivers; and
a computerized central data processing means in communication with each of said plurality of remote data processing means for controlling and monitoring said plurality of remote data processing means, said central data processing means including secondary communication means for receiving said nonroutine data and for transmitting said control data to said plurality of remote data processing means, said control data further including data responsive to said nonroutine data.

17. The system of claim 16 wherein said central data processing means communicates with said plurality of remote data processing means substantially only upon receiving said nonroutine data from the primary data processing means.

18. The system of claim 16 wherein said primary communication means comprises multiplexing means for transmitting time multiplexed to and receiving frequency multiplexed data from said plurality of remote data terminal means.

19. The system of claim 16 wherein said primary communication means comprises time multiplexing means including transmitter means for transmitting said control data having a predetermined identification code to a set of remote data terminal means responsive to said predetermined identification code, said remote data processing means being programmed for sequentially changing said identification code, and frequency multiplexing means including receiver means for simultaneously receiving response data transmitted from each of said set of remote data terminal means at a different frequency.

20. The system of claim 16 wherein said primary communication means includes a frequency shift key means for communicating with said plurality of remote terminal means in a frequency shift key mode.

21. A communications system for remote data acquisition and control comprising a data processing system and a plurality of remote user terminals each in communication with said data processing system over a single communication channel;

the data processing system comprising computer means for processing, storing and retrieving data, and communication means for time and frequency multiplexed communication between said computer means and each of said remote user terminals;

said computer means being programmed for generating control data for said remote user terminals, said control data having an identification code representative of a common set of said remote user terminals, and processing response data from said remote user terminals;

said communication means including means for transmitting said control data at a single frequency to said set of remote user terminals simultaneously over said single channel, means for receiving said response data at a plurality of frequencies from said set of remote user terminals simultaneously over said single channel, said receiving means including frequency-responsive means for processing said response data to identify the response data associated with each of said remote user terminals at which said response data was transmitted to said communication means;

each of said remote user terminals comprising means for receiving said control data from said data processing system, terminal address code-responsive means for generating said response data, and means for transmitting said response data to said data processing system at a frequency unique with respect to the frequencies of the response data of the other terminals in said set;

whereby said data processing system transmits said control data simultaneously to said common set of remote user terminals and receives said response data simultaneously from said set of remote user terminals.

22. The system of claim 21 wherein said communication means includes means for time division multiplexed (TDM) communications with a plurality of sets of said remote user terminals, and said computer means is further programmed for sequentially changing said identification number of said control data to enable said transmitting means of said communication means to transmit said control data to a different set of said remote user terminals during sequential time intervals.

23. The system of claim 21 wherein said frequency-responsive means of said communication means comprises a plurality of receiver means for receiving the response data according to frequency.

24. The system of claim 21 wherein said communication means of said data processing system and said receiving and transmitting means of said remote user terminals include frequency shift key means for communicating data between said data processing system and each of said remote user terminals in a frequency shift key mode.

25. A communications systems for remote data acquisitions and control comprising a central data processing system and a plurality of sets of remote user terminals, each set being in time and frequency multiplexed data communication with said central data processing system, wherein:

the central data processing system includes time division multiplexing means for sequentially processing data for each of said sets of remote user terminals, means for transmitting said control data simultaneously at one frequency to one of said set of remote user terminals, and means for receiving response data at a plurality of frequencies simultaneously from said set of remote user terminals, said central data processing system being programmed for generating control data for each set of said remote user terminals and for sequentially processing said response data from said set of remote user terminals;

said each of said remote user terminals in each set including means for receiving said control data from said central data processing system, means for generating response data for processing by said central data processing system and means for transmitting said response data to said central data processing system at a frequency unique with respect to the frequencies of the response data of the other remote user terminals in said set.

* * * * *